Figure 1:
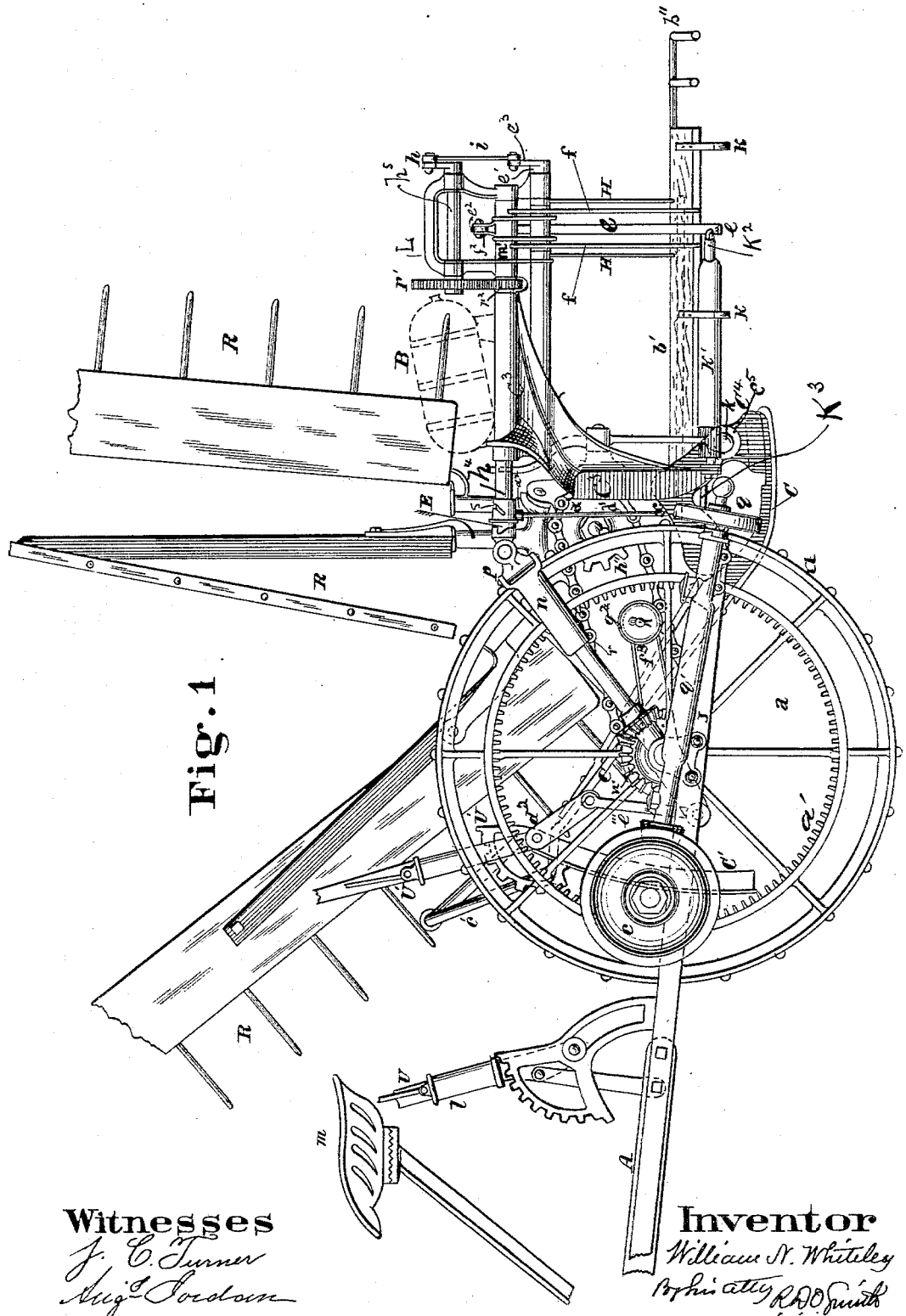

(No Model.)  W. N. WHITELEY.  5 Sheets—Sheet 1.

HARVESTER AND BINDER.

No. 323,613.  Patented Aug. 4, 1885.

Witnesses  Inventor
J. C. Turner  William N. Whiteley
Aug. Jordan  by his atty R. D. O. Smith (No Model.) 5 Sheets—Sheet 2.
W. N. WHITELEY.
HARVESTER AND BINDER.
No. 323,613. Patented Aug. 4, 1885.
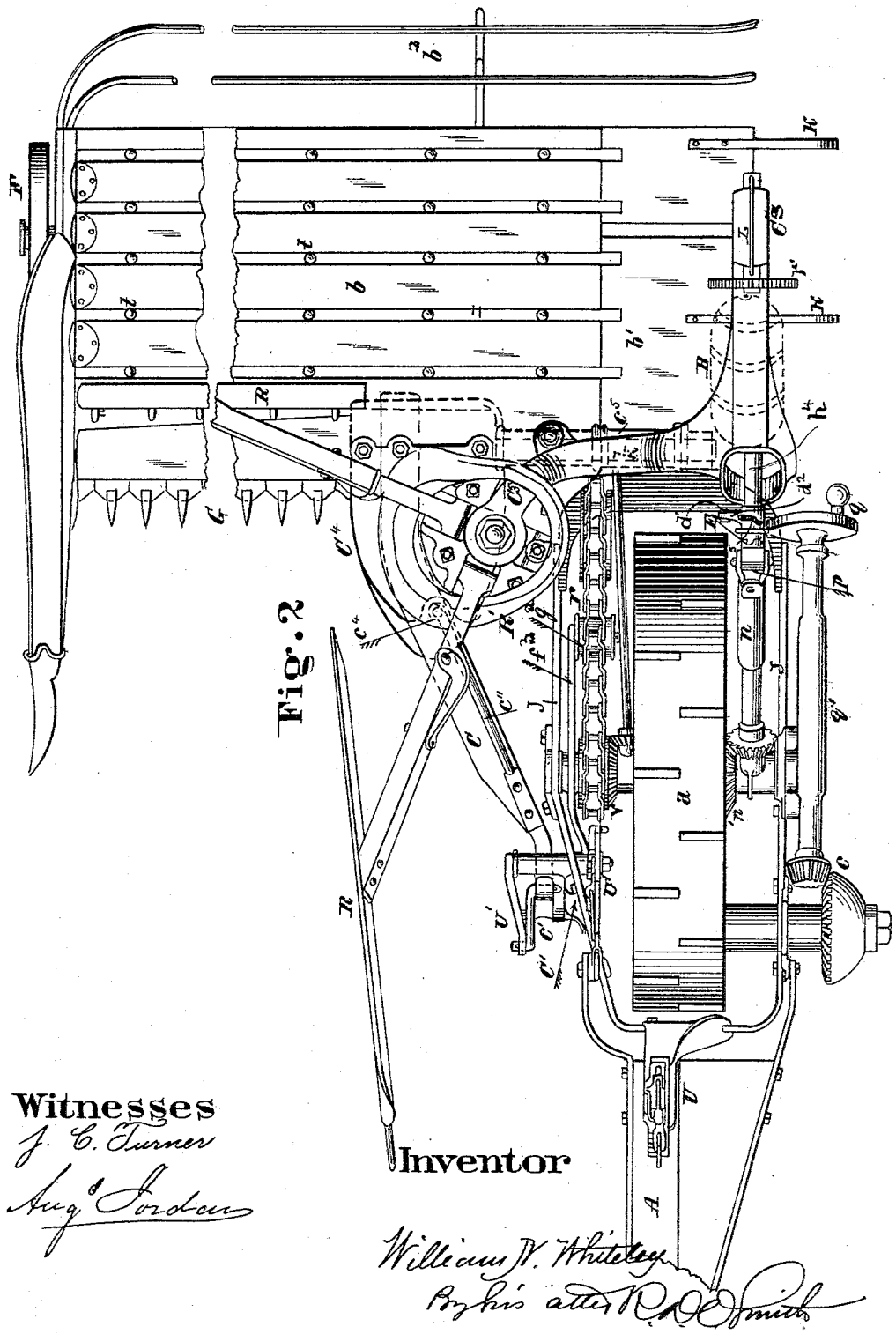
Witnesses
J. E. Turner
Aug. Jordan
Inventor
William N. Whiteley
By his atty R. D. O. Smith (No Model.) 5 Sheets—Sheet 3.
W. N. WHITELEY.
HARVESTER AND BINDER.
No. 323,613. Patented Aug. 4, 1885.
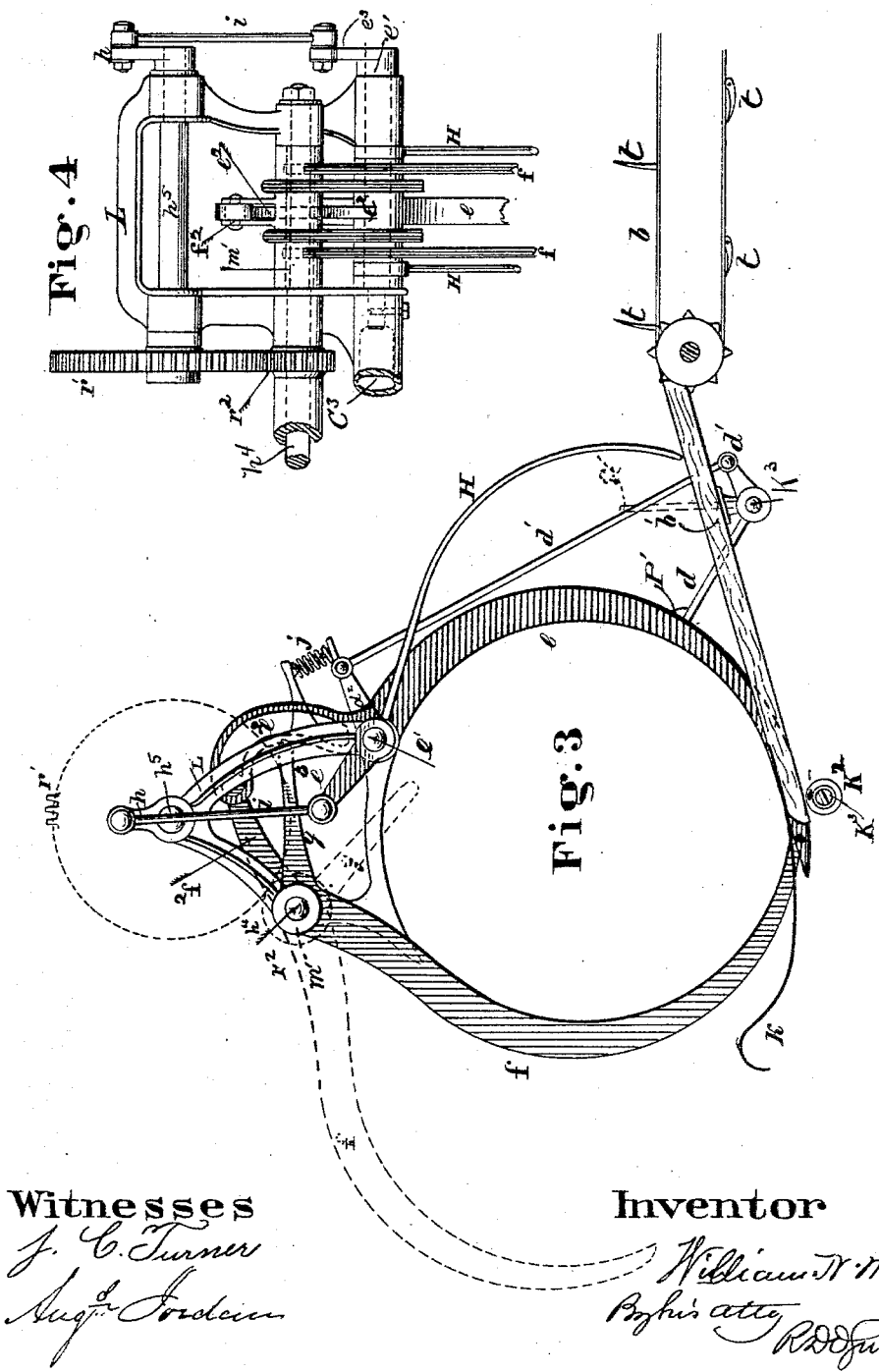
Witnesses
J. C. Turner
Aug. Jordan
Inventor
William N. Whiteley
By his atty
R. D. Smith (No Model.)  5 Sheets—Sheet 4.
W. N. WHITELEY.
HARVESTER AND BINDER.
No. 323,613.  Patented Aug. 4, 1885.
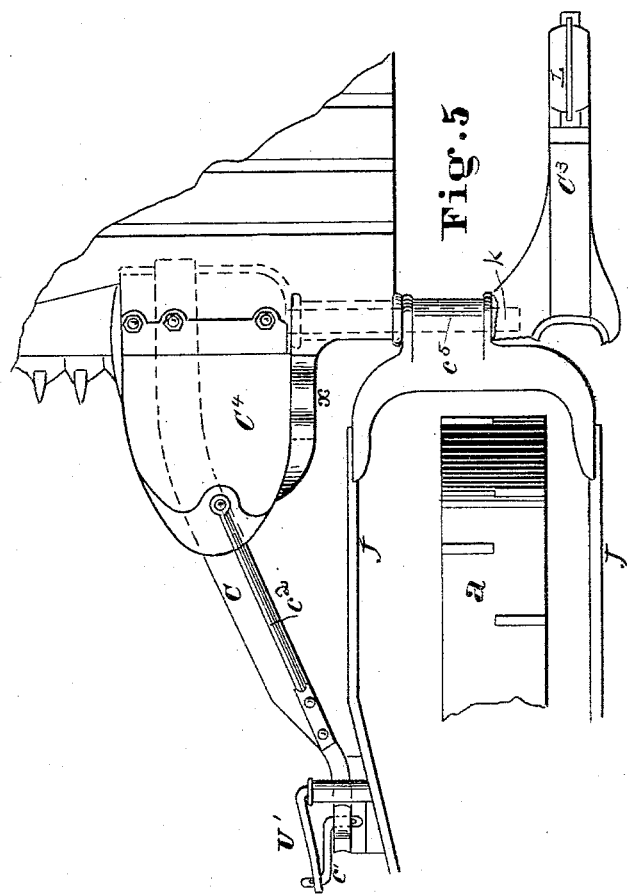
Witnesses  Inventor (No Model.) 5 Sheets—Sheet 5.
W. N. WHITELEY.
HARVESTER AND BINDER.
No. 323,613. Patented Aug. 4, 1885.
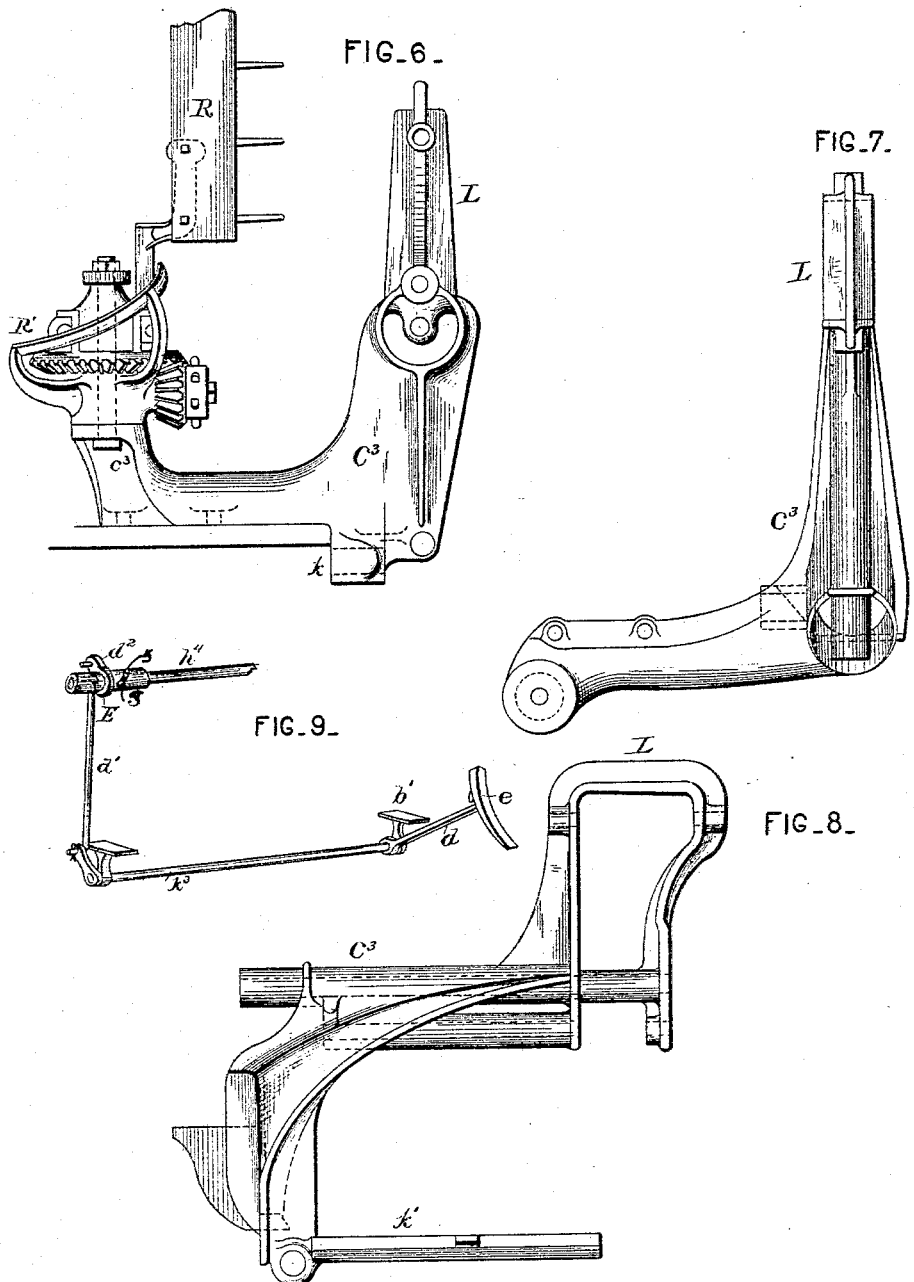

UNITED STATES PATENT OFFICE.

WILLIAM N. WHITELEY, OF SPRINGFIELD, OHIO, ASSIGNOR TO WHITELEY, FASSLER & KELLY, OF SAME PLACE.

HARVESTER AND BINDER.

SPECIFICATION forming part of Letters Patent No. 323,613, dated August 4, 1885.

Application filed January 10, 1881. (No model.)

*To all whom it may concern:*

Be it known that I, WILLIAM N. WHITELEY, of Springfield, county of Clark, State of Ohio, have invented a new and useful Improvement in Harvesters and Binders, of which the following is a specification.

My invention relates to that class of harvesters and binders which are provided with a binding attachment so situated and constructed in relation to the customary horizontal conveyer as to seize the cut grain as it is about to leave the aforesaid conveyer, compress it into a sheaf, encircle it with a band, secure the ends of the band, and eject the bound sheaf from the binding-table to the ground without the aid of manual labor.

In this application I do not claim anything new in the means used for uniting the ends of the band which encircles the sheaf, nor in the means used for encircling the sheaf with the band, because any of the well-known devices now in use for these purposes may be employed.

In the accompanying drawings, Figure 1 is a side elevation of my machine. Fig. 2 is a plan of the same. Fig. 3 is a rear side elevation of the compressor. Figs. 4 and 5 are details. Fig. 6 is a rear elevation of the frame-post. Fig. 7 is a plan of the same, the rake-stand being removed. Fig. 8 is a side elevation of the same. Fig. 9 is a perspective of the trip mechanism.

Letters of like character represent corresponding parts in all the figures.

My invention is illustrated as attached to a single wheel side and rear cut reaping-machine consisting of a main supporting-wheel, $a$, mounted in a main frame, J, to the front end of which a flexible tongue, A, is attached, and is controlled by the hand-lever U. At its rear end said frame is attached by means of the joint $c^5$ to the side extension, $k$, of the shoe $C^4$, which may be lowered to the ground or raised to the desired distance therefrom in the usual way by tilting the main frame J by means of the hand-lever U. The main wheel $a$ transmits motion by means of the internal gear-wheel $a'$ and pinion $c$ to the crank $q$ and pitman which operates the sickle G. A reel, R, is driven by a chain, $r$, and sprocket-wheels from the axle of the main drive-wheel communicating with a miter-gear connected with the shaft with which said reel revolves. The chain $r$ is longer than would be necessary to pass around the sprocket-wheels, and is provided with an idler-wheel, $g^2$, on an arm, $f^3$, which acts as a belt-tightener to keep said chain to its work. The object of this excess in length of the chain is to compensate for varying distances between the centers of the chain-wheels as the platform $b$ is elevated or depressed by means of the latch-lever U' acting upon the front end of the drag-bar C through its link $c'$.

The platform $b$ is provided with the well-known conveyer, composed of endless chains provided with falling teeth $t\ t$, and passing over pulleys driven in this case by miter-gear V on the main axle and a transmitting-shaft. These falling rake-teeth $t$ may be arranged at suitable distances apart and caused to travel in slots in the platform $b$. The platform is supported on the grain side by an adjustable wheel, F, and on the other side by the drag-bar C and the shoe $C^4$ attached thereto and to the main frame supported on the wheel $a$.

The foregoing general description is deemed sufficient, reference being had to the accompanying drawings, to illustrate the class of reaping-machines to which I shall preferably attach my improved binding apparatus, which I will now describe.

The drag-bar C is attached at its rear end to the shoe $C^4$, and at its front end it is connected by the link $c'$ with the latch-lever U', whereby said forward end of the drag-bar may be raised or lowered at will by the attendant for the usual purpose, to wit, so as to tilt the platform on its pivotal connection with the main frame, and thereby maintain said platform in a horizontal at whatever height it may be adjusted by the lever U.

The shoe $C^4$ has a lateral extension, $k$, which passes through a socket, $c^5$, in the rear end of the main frame J, and thereby becomes a hinged support for the inner end of the cutter bar and platform. The post $C^3$ stands upon an extension, $k$, of the shoe $C^4$, and outside the joint $c^5$, and supports the reel R at one side and the binding mechanism and twine-box at the other side.

The binding mechanism comprises the principal shaft $h^4$, to which motion is transmitted by the tumbling-shaft $n$, and the counter-shafts $h^5$ and $e'$, respectively, provided with cranks $h$ and $e^3$, coupled by the link $i$. Said counter-shafts are driven by motion transmitted from the shaft $h^4$ by the pinion $r^2$ and gear-wheel $r'$. The shaft $h^4$ is supported in a long sleeve-box on the post $C^3$, and the counter-shafts have their bearings supported in a frame, L, also attached to and supported by the post $C^3$.

The compressor-arms $ff$ are attached to a sleeve, $m'$, which is placed on the extended end of the shaft $h^4$ as an axis, and the binder-arm $e$ is mounted on the shaft $e'$. The arm $e$ has a curved and slotted extension-arm, $e^2$, and the sleeve $m'$ of the compressor-arms $ff$ has an arm, $f^2$, provided with a pin or friction-roller which engages with the slot in the arm $e^2$, and thereby simultaneous motion is transmitted from the binder-arm $e$ to the compressors $ff$. The sleeve $m'$ also has attached to it the ejectors $g$, which descend and push the sheaf off the platform when the compressors $f$ are retracted.

The elastic cut-off fingers H, attached to the shaft $e'$, descend with the binder-arm and arrest the flow of grain during the time the band-securing mechanism is in action.

The tumbling-shaft $n$ is constructed to compensate for varying lengths, and is provided with a universal joint, $p$, at its connection with said shaft $h^4$. Said shaft $h^4$ is provided with a clutch, E, capable of either connecting or detaching the binding mechanism with or from said shaft $n$. The clutch E is moved into engagement through intermediate devices by the trip-lever $d$ when said lever is forced over by pressure of the incoming grain, and is retained in that position by the engagement of said lever with the projection P' on the binder-arm $e$ until the binding is completed. This forward movement of the lever $d$ is transmitted to the clutch by the shaft $k^3$, rod $d'$, and arm $d^2$, attached to the clutch E, and when released the lever is returned to its initial position by the spring $j$, and the clutch E is retracted and disengaged by the action of the cam 5 or the resiliency of a spring. Motion is transmitted from the main wheel to the shaft $n$ by means of a bevel-gear, $n'$.

The rods $b^2$, at the rear of the platform, form a support for the cut grain beyond the conveyer-platform $b$, thus obviating the necessity for widening the conveyer and increasing the weight of the machine.

The yielding metallic extension-strips K assist in holding the grain prior to its being completely encircled by the binding and compressor arms $ef$, and are slightly turned upward at their ends, to more effectually accomplish this purpose.

The operations of the machine may be briefly described as follows: The reel R being set in motion, the beaters depress the grain upon the sickle G, where it is cut and caused to fall upon the platform $b$, whence it is conveyed to and packed against the trip-lever $d$ by the rake-teeth $t$ on the endless conveyer-chains. When a sufficient quantity of grain has accumulated against the lever $d$ to form a sheaf, the lever will have been thereby pushed outward slightly, and the rod $d'$ being thereby pushed upward causes the clutch E to connect the tumbling-shaft $n$ to the binding mechanism. The compressors $ff$ are carried on the shaft $h^4$, and the binder-arm $e$ is carried by the shaft $e'$, to which motion is transmitted from the shaft $h^4$ by means of the gear $r'$ $r^2$, shaft $h^5$, crank-arm $h$, link $i$, and crank-arm $e^3$.

The slotted extension $e^2$ of the binder-arm $e$, by aid of a friction-roller upon the arm $f^2$ of the compressor-sleeve $m'$, causes said compressor-arms and binder-arm to move simultaneously toward each other to compress the grain, encircle it with a band, and convey both ends of the band to a mechanism whereby they are knotted together. When completely bound, the sheaf is discharged from the binder-table $b'$ and extension-strips K by the ejector $g$, which moves upon it while the compressor is opening for its release, and the spring $j$ returns the trip-lever $d$ to its former position.

Having thus described my invention, what I claim as new, and desire to secure by Letters Patent, is—

1. A single wheel side and rear cut reaping-machine provided with a drag-bar, C, ratchet-lever U', and conveyer-platform $b$, combined with a shoe, $C^4$, the post $C^3$, attached to an extension of said shoe, a revolving reel, R, supported on said post, and the binding mechanism, also supported by said post, substantially as and for the purpose set forth.

2. The drag-bar C, shoe $C^4$, post $C^3$, attached to an extension of said shoe, the binding mechanism supported by said post, and the conveyer-platform $b$, supported at its inner end by said shoe, combined with the miter-gear $n'$, tumbling-shaft $n$, having the universal joint $p$, and the clutch E, substantially as and for the purpose specified.

3. A binder-table, $b'$, provided with a lever, $d$, combined with a connecting-rod, $d'$, spring $j$, clutch E, and stop-lug $p'$, projecting from the binder-arm $e$, as and for the purpose specified.

4. A bundle-compressor composed of the curved binder-arm $e$, secured to the shaft $e'$, and provided with the slotted arm $e^2$, and the compressor-arm $f$, provided with the arm $f^2$, engaging with and operated by the slot in the arm $e^2$, in combination with the shaft $h^5$, provided with the crank $h$, the crank-arm $e^3$ on the shaft $e'$, and the connecting-link $i$, substantially as and for the purpose set forth.

In testimony whereof I have hereunto set my hand this 31st day of December, 1880.

WILLIAM N. WHITELEY.

Witnesses:
 HENRY MILLWARD,
 CHAS. L. BOGLE.